United States Patent
Willis et al.

[11] 3,805,591
[45] Apr. 23, 1974

[54] PARTICLE ANALYZER

[75] Inventors: Barry G. Willis, Palo Alto; Robert B. Taggart, Jr., Mountain View; Knud L. Knudsen, Los Altos Hills; David Gee-Clough, Pacifica, all of Calif.

[73] Assignee: Hewlett-Packard Company, Palo Alto, Calif.

[22] Filed: Oct. 22, 1971

[21] Appl. No.: 191,661

[52] U.S. Cl. .............. 73/28, 73/12, 73/432 PS, 235/92 PC
[51] Int. Cl. .............................. G01n 3/08
[58] Field of Search ............ 73/12, 28, 170, 432 PS; 235/92 PC; 324/71 PC

[56] References Cited
UNITED STATES PATENTS

| | | | |
|---|---|---|---|
| 3,159,029 | 12/1964 | Ruderman | 73/28 X |
| 3,267,720 | 8/1966 | Escallier et al. | 73/12 |
| 3,408,866 | 11/1968 | Gibson et al. | 73/28 X |
| 3,446,068 | 5/1969 | Slattery et al. | 73/12 X |
| 3,587,291 | 6/1971 | Escallier | 73/12 |
| 3,561,253 | 2/1971 | Dorman | 73/28 |

OTHER PUBLICATIONS

"Electronic Particle Counter for Engine Combustion Studies" – Automotive Industries – Vol. 104, No. 11 – June 1, 1951 – pp. 52, 88. (Call No. TL1 – A75 in Sci. Libr.)

Primary Examiner—Richard C. Queisser
Assistant Examiner—Arthur E. Korkosz
Attorney, Agent, or Firm—Stephen P. Fox

[57] ABSTRACT

Particles in the atmosphere are accelerated to sonic velocity while being drawn into a chamber through a gas passageway. Upon leaving the passageway, the particles impinge on a transducer in the chamber. The consequent electrical output signals from the transducer are processed by amplifier and threshold detector circuitry to produce an output pulse corresponding to each particle which impinges on the transducer. These pulses are counted for a selected time interval, and since the flow rate through the gas passageway is known, the count obtained indicates the total number of particles in a certain volume of the atmosphere. The threshold detector is adjustable to select the mass range of the particles which are counted.

9 Claims, 11 Drawing Figures

PATENTED APR 23 1974

INVENTORS
BARRY G. WILLIS
ROBERT B. TAGGART JR.
KNUD L. KNUDSEN
DAVID GEE-CLOUGH

BY Stephen P. Fox
ATTORNEY

PARTICLE ANALYZER

BACKGROUND OF THE INVENTION

The present invention relates to a device for detecting the atmospheric concentration of small particle pollutants such as dust and the like.

One technique for measuring particle concentration in the atmosphere has been to collect the particles over a period of time on an adhesive surface, then count them through a microscope, and finally extrapolate the count to determine atmospheric particle concentration. This technique is obviously time consuming. In addition, it is not selective as to the mass of the particles counted.

A somewhat more sophisticated variation of the above-described technique is to collect the particles on a transducer which is electrically coupled as an element in an oscillator circuit. The bulk mass of the collection of particles is determined by measuring the frequency shift of the oscillator due to the loading effect of the particles which adhere to the transducer. Thereafter the bulk mass measurement is converted to atmospheric particle concentration using statistical values for the mass of individual particles. This method is also time consuming and is clearly not selective to individual particle mass.

Heretofore, instruments on board satellites have detected extraterrestrial meteoric dust particles which impinge on a transducer. However, the detecting techniques used by such instruments are unsuitable for use in determining small particle polutants in the earth's stmosphere. Meteoric dust particles travel in space at random velocities that average about 30 km/sec. The momentum of such particles is very high, even for small particles in the picogram mass range, so they can easily be collected and detected by a simple, low sensitivity transducer having a large active surface area compared to the size of the impacting particles, e.g., a surface area on the order of one square inch or more. The transducers which detect high momentum particles in space are not sensitive enough to detect particles in the earth's atmosphere which generally move at very low velocities and often exist in a static state.

Particle detectors of the type used on satellites have several additional limitations. They are sensitive only to the momentum of particles traveling at random velocities. Thus any determination of particle mass can only be approximated through calculations using an average value for particle velocity.

An object of the present invention is to provide a device for detecting the concentration of small particles as they exist in the earth's atmosphere and to perform such particle detection quickly and accurately on a mass selective basis for particle masses down into the picogram range.

SUMMARY OF THE INVENTION

The present invention, in its illustrated embodiment, includes a sealed chamber containing a transducer having a small surface area. A gas conduit has an end which terminates in spaced-apart relation with the transducer surface. The conduit extends out through the chamber wall to communicate with the atmosphere. Air and dust particles and the like therein are drawn into the chamber through the gas conduit at a predetermined constant flow rate to impinge on the transducer surface.

The transducer produces output impulses in response to the impacting particles. These impulses are amplified by a high pass amplifier circuit which suppresses noise signals from the transducer due to air rushing past it, thereby to minimize the signal-to-noise ratio. The velocity of the impacting particles is maintained constant, so that the magnitude of the transducer output impulses are dependent on particle mass. These impulses are processed by a threshold detector and pulse stretching circuitry and then fed to a counter. The count obtained over a predetermined time interval indicates the concentration of particles in a selected volume of air having a mass greater than that corresponding to the threshold level of the threshold detector. Means are provided for adjusting the threshold level of the threshold detector, thereby to select the mass range of the particles that are counted. Particle concentrations can be determined repeatedly and quickly on a real time basis merely by resetting the counter and obtaining a new count for another time period.

The present invention has several additional features. Detection sensitivity is optimized by making the transducer small enough so that it will produce output impulses in response to particles in the picogram mass range when the particles impact the transducer at the selected flow velocity established in the gas conduit. Also, a heating element is disposed in thermal contact with the gas conduit to maintain the air flowing therethrough at a constant temperature at the outlet of the conduit so that the air flow velocity is not changed by ambient temperature variations.

DESCRIPTION OF THE PREFERRED EMBODIMENT

Figure 1:
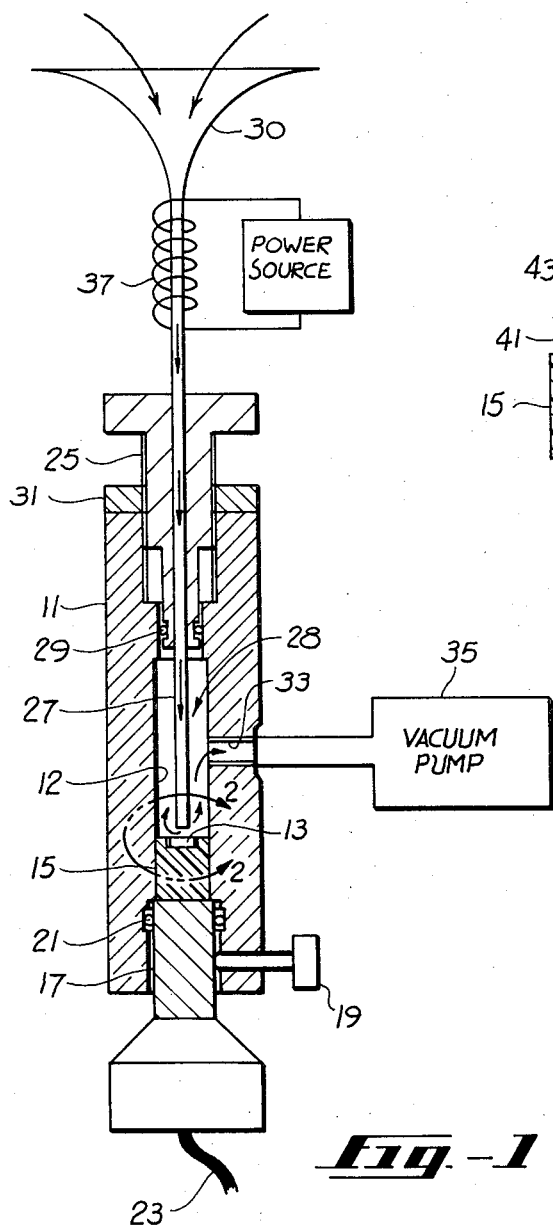
FIG. 1 is a cross-sectional view of the preferred embodiment of the transducer chamber of the present invention.

Referring now to FIG. 1, there is shown in cross-section a cylindrical hollow member or housing 11. At one end of the bore 12 in cylindrical member 11 there is disposed a piezoelectric transducer 13 which is mounted on a non-conductive plastic block 15, as hereinafter described. The plastic block 15 in turn is mounted on a metal plug 17. The entire transducer mounting assembly is inserted into the bore 12 in the housing 11 and held firmly in place by a threaded set screw 19. An 0 ring 21 is disposed between the outer wall of plug 17 and the inner wall of the bore in housing 11 to form an airtight seal between the internal and external portions of the housing. The transducer mounting assembly has a longitudinal bore therein (not shown in FIG. 1) which contains the signal leads for transducer 13. These signal leads exit at the end of the mounting assembly, as indicated by the wire 23.

The other end of the bore 12 in housing 11 is internally threaded to receive a screw type plug 25. Plug 25 has a longitudinal bore therein which frictionally engages and firmly holds a glass conduit or tube 27. One end of the tube 27 is disposed in close spaced-apart relation with the transducer 13 inside of the chamber 28 formed by the housing 11 and end plugs 17,25; whereas the other end of tube 27 has a funnel-shaped portion 30 which terminates externally of the housing 11. An 0 ring 29 disposed between plug 25 and the internal walls of housing 11 provides an air-tight seal. The spacing between the end of the glass tube 27 and transducer 13 may be adjusted by rotating the threaded plug 25. Once adjusted, plug 25 is held in its desired position by a lock nut 31.

A lateral bore 33 through a side wall of the housing 11 serves as a vacuum port and is coupled to a vacuum pump 35. The vacuum pump 35 produces a partial vacuum in the chamber, thereby to draw air or other gas and any particles therein into the chamber 28. Preferably, the flow velocity of the gas at the exit of tube 27 is sonic velocity, which is given by the following equation:

$$v_c \cong \sqrt{(c_p/c_v)RT} \quad (1)$$

where $v_c$ is the sonic velocity in meters per second, $c_p$ is the specific heat of the flowing gas at constant pressure, $c_v$ is the specific heat of the gas at constant volume, R is the universal gas constant given in units of meter$^2$/sec$^2$°K, and T is the absolute temperature of the gas in degrees Kelvin. It has been found that air will flow at sonic velocity when the pressure maintained in the chamber by vacuum pump 35 is on the order of one-half atmospheric pressure or less. A heating element 37 is disposed in thermal contact with the inlet throat of tube 27 to heat the flowing gas and thus control its flow velocity through the tube. Heating element 37 also inhibits condensation on the transducer and serves to minimize the effects on flow velocity of changes in the ambient temperature. At room temperature (approximately 293°K), the flow velocity of air leaving the tube 27 remains substantially constant at a sonic velocity of 313 meters per second for a wide range of pressures in a chamber, provided that the pressure is less than one-half atmospheric pressure.

Figure 2:
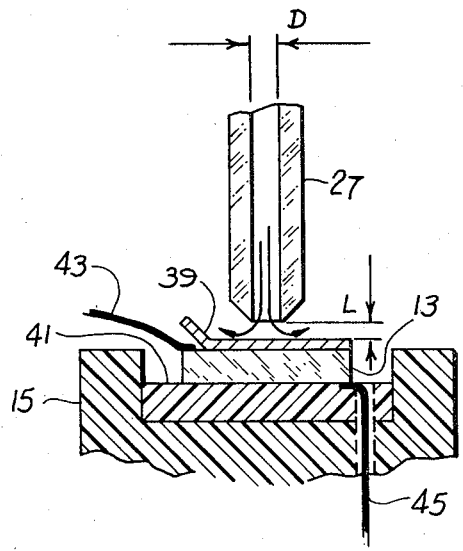
FIG. 2 is an enlarged cross-sectional view taken in the area 2—2 of FIG. 1.

As air and dust particles and the like therein leave the tube 27 at sonic velocity, the particles impinge on transducer 13 and thereafter are drawn out of the chamber through vacuum port 33. FIG. 2 shows the configuration of tube 27 and transducer 13 in enlarged form. The spacing L, between the end of tube 27 and the closest surface of the transducer 13 may be made as small as one-fourth of the inside diameter, D, of the tube without restricting the flow. Satisfactory operation has been achieved with a separation, L in the range of 0.003 inch to 0.050 inch and inside diameter, D in the range of 0.010 inch to 0.040 inch. The piezoelectric transducer 13 is formed from a lead zirconate-lead titanate material commonly known as PZT-5 and available from the Clevite Corporation, for example; however other piezoelectric materials could be used. Overlaying the upper surface of transducer 13 is a stainless steel protective plate 39 which prevents erosion of transducer 13 by particles impinging thereon. The wear plate 39 is bonded to transducer 13 by a suitable epoxy material. The lower surface of transducer 13 (as viewed in the drawing) is bonded to a backing material 41, which may be formed of tungsten polyethylene material, for example. The backing material is designed to have high acoustic losses and to match the acoustic impedance of the transduer. The backing 41, in turn, is mounted on the plastic block 15 formed of Delrin, an acetal homopolymer resin made by Du Pont. A pair of signal leads 43, 45 are suitably bonded to the upper and lower surfaces, respectively, of transducer 13. Signal lead 45 may be directed through a bore in the transducer mounting assembly and connected to the signal lead 23 shown in FIG. 1. Signal lead 43 is connected to a suitable common or ground terminal (not shown) and may be directed through a bore in the transducer mounting assembly in a manner similar to that shown for lead 45.

The impact of a particle on transducer 13 causes a voltage to be developed across its output signal leads 43, 45 which is given by the following equation:

$$V_s = hc/\epsilon A \, (mv) \quad (2)$$

assuming that the particle impact time is less than the acoustic propagation time through the transducer. In equation 2 above, $V_s$ is the open circuit output voltage, $h$ is the piezoelectric constant ratio of charge to force, $c$ is the speed of sound in the piezoelectric material, $\epsilon$ is its dielectric constant, $A$ is the transducer top surface area, and $mv$ is the particle momentum. As described in more detail hereinafter, the transducer output signal is proportional to the mass, $m$, of the impacting particle because the velocity, $v$, of the particle is held constant at sonic velocity, $v_c$, given by equation 1 above. Transducer 13 is preferably a very small disc having a diameter on the order of one millimeter or less and a thickness on the order of 0.17 millimeter. Consequently, the surface area $A$ is also very small. As shown in equation 2 above, the transducer output signal $V_s$ increases as the surface thereof is made smaller. With this arrangement, the transducer will be caused to produce detectible output signals for even very small particles in the picogram mass range. It has been found, by laboratory calculations, that the transducer 13 has the capability of producing a detectible output signal in response to the impacting of a particle having a mass of only about 1 picogram, i.e. $10^{-12}$ gram. This mass corresponds to a sand particle having a diameter of about 1 micrometer, i.e. $10^{-6}$ meter. Particles of smaller mass could be detected by reducing the size of the transducer.

Figure 3:
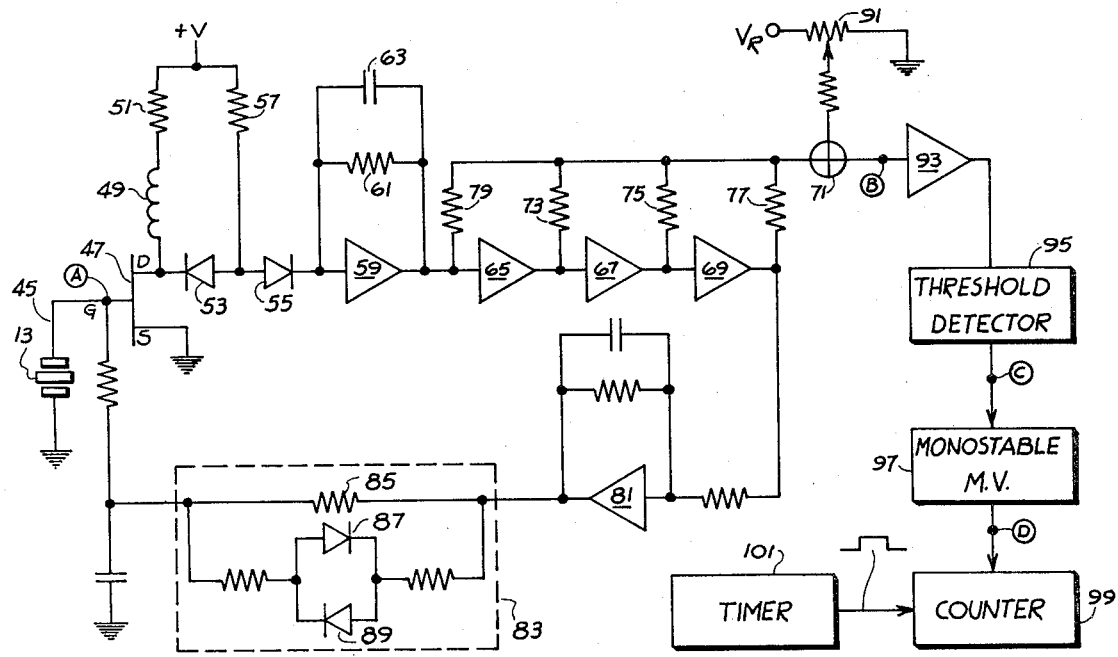
FIG. 3 is a combined schematic and block diagram of the preferred embodiment of the circuitry for processing the electrical impulses from the transducer shown in FIG. 1.

FIG. 3 illustrates the circuitry for processing the electrical impulses produced by transducer 13. As shown, transducer 13 is coupled through signal lead 45 to the gate input (G) of a field-effect transistor (FET) 47. Transistor 47 is coupled as an amplifier with its source (S) electrode connected to ground and its drain (D) electrode connected through an inductor 49 and resistor 51 to a voltage source +V. Inductor 49 serves to exclude the thermal noise produced by resistor 51 from the signal path through the drain (D) electrode of FET 47. The FET input amplifier has a signal rise time capability equal to the acoustic propagation time through transducer 13 and has an input capacitance which is equal to the transducer capacitance. For these conditions, the signal-to-noise ratio of the input amplifier is optimum and is given by the following expression:

$$S/N = 0.25 \, h \, \sqrt{c/\epsilon}(mv/e_n \sqrt{AC_{11}}) \quad (3)$$

where the terms $h$, $c$, $\epsilon$, $A$, and $mv$ are as described above with respect to equation 2, and where $e_n$ is the short circuit noise voltage spectral density and $C_{11}$ is the short circuit input capacity of the FET 47. It is to be noted that the optimum signal-to-noise ratio of the input amplifier is dependent on the term $e_n \sqrt{AC_{11}}$. Therefore, the signal-to-noise ratio is independent of transducer thickness and may be optimized for a given transducer material by minimizing the surface area $A$ of the transducer upon which the particles impinge.

The masses of the particles that impinge on transducer 13 may vary over a very wide range; hence the output signals from the drain electrode of FET 47 also may have a wide range typically on the order of 100 dB. These signals are applied to a network comprising two diodes 53, 55 which are connected in series with opposite polarity senses. The common junction between these diodes is connected through a resistor 57 to the voltage source $+V$. The two diodes operate as signal clipping diodes to limit the transducer signal to 2 volts peak-to-peak at the output of amplifier 59. The signals transmitted through diodes 53, 55 are applied to the input of an amplifier 59 which is connected as an operational amplifier having a feedback loop including a resistor 61 and a capacitor 63 coupled in parallel.

The output signal from transducer 13 includes a noise signal component due to the turbulence of air rushing past the transducer surface. This noise from the air flow is generally in a low frequency range which is typically less than 400 kHz. In comparison, the signal due to particle impact on the transducer has a very fast rise time in the nanosecond range, corresponding to a signal in the frequency typically on the order of 100 MHZ or more. As described in more detail below, the overall amplifier circuitry has a high pass filter characteristic and serves to amplify the impulses caused by particle impact while sharply attenuating signals in the noise frequency band.

The output signal from amplifier 59 is fed to a compression amplifier circuit comprising first, second and third amplifier stages 65, 67, 69, respectively. The compression amplifier circuit produces an output signal which is an approximation of the logarithm of the input signal, thereby to compress wide variations in the amplified transducer output signal into a narrower signal range. More specifically, the three stage compression amplifier uses a successive limiting technique to approximate a logarithmic output characteristic by a series of straight line output characteristics. For small signal inputs to amplifier 65, all three of the amplifier stages 65, 67, 69 operate in an actieve amplification mode to provide amplified output signals through resistors 73, 75, 77, respectively to the summing point 71. When the input signal increases to a predetermined level, amplifier 69 saturates and the output thereof limits at a constant level signal which is combined with the amplified signals from amplifiers 65, 67 and fed to the summing point 71. A further increase in the input signal level will cause amplifier 67 to saturate and limit at a constant level output signal, in which case constant level signals from amplifiers 67, 69 are combined with the amplified signal from amplifier 65. Finally, with a further increase in the input signal level, amplifier 65 saturates, and the constant level output signals from all three amplifiers are combined with the input signal through a resistor 79 and fed to the summing point 71.

The output of amplifier 69 is connected in a feedback loop to the gate (G) input of the FET 47. This feedback loop includes an amplifier 81 which in turn has its own R-C feedback loop. The output of amplifier 81 is coupled to a network 83 including a resistor 85 which transmits small signals, and a pair of parallel-connected, oppositely-poled diodes 87, 89 which operate to speed up the transmission of larger signals. The output of network 83 is coupled through a resistor 84 to the gate of FET 47. The overall feedback loop, including amplifier 81, network 83, and resistor 84 serves as a dc feedback path which attenuates signal and noise in the low frequency band and operates to stabilize the overall amplifier circuitry at an operating point which is in the center of its linear operating range. In addition, a high pass filter characteristic is produced by the capacitive impedance of transducer 13 in combination with the overall feedback amplifier circuitry including FET 47 and amplifiers 59, 65, 67, 69 and 81.

The output signals from the three stage compression amplifier circuit is combined at summing point 71 with a selected signal level obtained from a potentiometer 91 which is connected to a predetermined reference voltage $V_R$, and the resulting signal is applied through an amplifier 93 to a threshold detector circuit 95, which may be a conventional Schmitt trigger, for example. Threshold detector 95 produces an output pulse in response to each amplified signal impulse from transducer 13 which exceeds a predetermined signal level. The output from detector 95 drives a monostable multivibrator 97 which in turn produces an elongated output pulse having a predetermined time duration in response to the first of a series of input pulses received from the detector 95. The operation of the threshold detector 95 and multivibrator 97 is described in more detail hereinafter.

Each output pulse from the monostable multivibrator 97 is counted by a counter 99 during the time interval that the counter is enabled by a gating signal from a timer 101. The time interval of the gate signal from timer 101 is selected so that the count obtained by counter 99 represents the number of particles contained in a selected volume of the atmosphere. Counter 99 includes a suitable readout device and reset circuitry (not shown), so that repeated counts of particle concentration in the atmosphere may be obtained rapidly on a real time basis and easily read by an operator.

Figure 4:
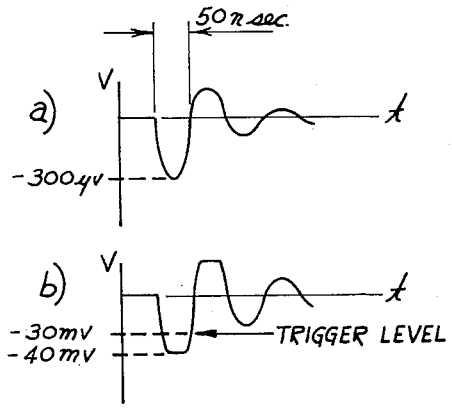
FIGS. 4a–d and 5a–d are waveform diagrams illustrating the signals obtained at selected points in the circuit of FIG. 3.

The overall operation of the transducer processing circuitry may best be understood with reference to FIGS. 4a–d and 5a–d. FIGS. 4a–d illustrate the circuit operation at the corresponding points referenced in FIG. 3 for small signal outputs from transducer 13 which are produced by small impacting particles on the order of 10 picograms, for example. FIG. 4a shows the output signal from the transducer at point A which is produced by a single particle impinging upon the transducer. The particle produces a damped oscillatory signal having an initial impulse peak on the order of 300 microvolts and duration on the order of 50 nanoseconds. FIG. 4b shows the amplified signal at point B on a different voltage scale than that shown in FIG. 4a. Also shown in FIG. 4b is the preset voltage level at which threshold detector 95 is triggered to produce an output pulse. The trigger level is arbitrarily set at 30 millivolts, so that any signal which exceeds this magnitude will operate the threshold detector. The signal level at which threshold detector 95 is triggered may be adjusted by adjusting potentiometer 91. This has the effect of shifting the signal shown in FIG. 4b vertically on the voltage axis. FIG. 4c illustrates the output of the threshold detector 95 at point C in FIG. 3. The output pulse occurs during the time that the amplified transducer signals exceed the trigger level of the threshold detector, neglecting the well-known hysteresis effects that may occur if a Schmitt trigger circuit is used. The pulse shown in FIG. 4c triggers monostable multivibrator 97 which, in turn, produces an elongated output pulse as shown in FIG. 4d. In the embodiment described herein, the output pulse from monostable multivibrator 97 is on the order of 11 microseconds long. The latter pulse is counted by counter 99 to indicate the detection of one particle in the atmosphere.

Figure 5:
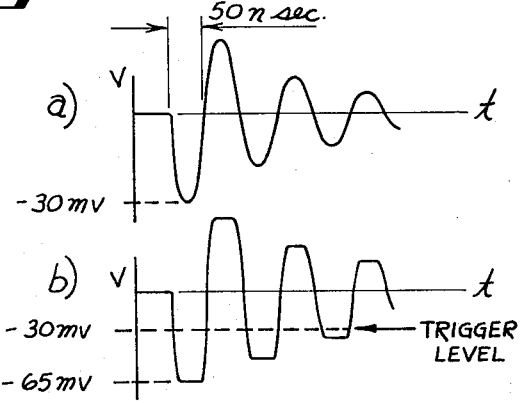

FIGS. 5a–d illustrate the operation of the transducer circuitry for large signals which are produced in response to particles having a relatively large mass on the order of one nanogram, i.e., $10^{-9}$ grams. As shown in FIG. 5a, the transducer output signal is a damped oscillation similar to that shown in FIG. 4a, except that the first impulse peak is much larger, on the order of 30 millivolts in magnitude. FIG. 5b illustrated the amplified signal at point B, and as shown, the peaks of the signal are flattened due to the compression effects of the three stage compression amplifier described above. The trigger level of threshold detector 95 is 30 millivolts, the same as shown in FIG. 4b, however, the damped oscillations of the larger signal decrease more slowly in magnitude, so that three signal peaks exceed the trigger level rather than one such peak as shown in FIG. 4b. As a result, threshold detector 95 produces three output pulses, as shown in FIG. 5c. The second and third pulses from detector 95 are redundant pulses produced by a single particle impact. As shown in FIG. 5 (d), monostable multivibrator 97 eliminates ths redundancy and prevents counter 99 from counting each of the three pulses by producing a single elongated output pulse having a leading edge corresponding to that of the first output pulse from the detector 95 and a trailing edge which occurs at the predetermined time interval, e.g. 11 microseconds, later. The length of the output pulse from multivibrator 97 is selected so that this pulse terminates after the last one of the transducer impulses produced by a single impacting particle. Thus, only one particle is counted by counter 99 even through the particle has a mass large enough to produce a substantial "ringing" effect in the transducer.

As stated above, the pulses from multivibrator 97 are counted by counter 99 during the time interval that coincides with the duration of the enabling signal from timer 101. Preferably this enabling signal is chosen to have a duration such that the count obtained directly indicates atmospheric particle concentration in units of particles per chosen unit volume, where the counted particles are those having a mass larger than a selectable lower limit.

In an alternative embodiment of the system of the present invention, the output of the compression amplifier circuit comprising the three amplifier stages 65, 67, 69 could be connected to a multichannel pulse-height analyzer similar to the type used in nuclear radiation detection and described for example in a book entitled "Nuclear Radiation Detection" by William G. Price, published by McGraw-Hill, Inc., 1964, pages 394–396. Such an anlyzer typically employs a plurality of signal level discriminators set at successive window levels and each associated with its own counter. The output of the analyzer would initiate the quantity distribution of particles in the air in predetermined mass ranges. Suitable digital processing means could be employed to convert the quantity distribution readings into a mass distribution, or to combine the quantity distribution readings into a signal representing the total mass of all particles in a given unit volume of air.

We claim:

1. An apparatus for measuring the concentration of particles in the atmosphere comprising: means defining a chamber;

piezoelectric transducer means having a sensing surface and being disposed within said chamber for producing a piezoelectric output signal in response to the momentum of particles which impinge on said sensing surface;

conduit means having one end terminating externally of said chamber for receiving particles in the atmosphere and another end terminating internally of said chamber in predetermined spaced-apart relation with said sensing surface of said transducer means;

vacuum means coupled in gas communication with said chamber for producing a partial vacuum in said chamber to establish a predetermined constant gas flow velocity through said conduit means into said chamber, thereby to draw particles in the atmosphere into said chamber and accelerate said particles for impingement on said sensing surface of said transducer means at said predetermined constant velocity;

circuit means for processing the piezoelectric output signals from said transducer means to produce an output pulse representative of the mass of each particle which impinges on said transducer sensing surface; and means coupled to said circuit means for counting said output pulses during a predetermined time interval, thereby to indicate the concentration of particles in the atmosphere.

2. The apparatus of claim 1, wherein the predetermined gas flow velocity established by said vacuum means is sonic velocity.

3. The apparatus of claim 1, wherein said surface of said transducer means has an area which is less than one square millimeter.

4. The apparatus of claim 1, further including plate means disposed on said surface of said transducer means for protecting said surface from erosion by particles impinging on said transducer.

5. The apparatus of claim 1, wherein said circuit means includes:

means coupled to the output of said transducer means for amplifying signals therefrom;

threshold-detecting means coupled to the output of said amplifying means for producing an output pulse whenever an amplified output signal from said transducer means exceeds a predetermined threshold level; and delay means coupled to the output of said threshold-detecting means for producing an elongated pulse of predetermined duration in response to the occurrence of an output pulse from said threshold-detecting means, the output of said delay means being coupled to said counting means, thereby to preclude counting of redundant pulses produced by a single particle impinging on said transducer means.

6. The apparatus of claim 5, wherein said threshold detecting means includes means for selecting the magnitude of said threshold level, thereby to permit detection of particles having a selected minimum mass.

7. The apparatus of claim 5, wherein said amplifying means includes:
- a field-effect transistor having source, drain and gate electrodes, said gate electrode being coupled to the output of said transducer means;
- an amplifier circuit coupled to said source and drain electrodes; and
- feedback means for coupling the output of said amplifier circuit to the gate electrode of said field-effect transistor, thereby to form a closed loop feedback amplifier having a response characteristic operative to attenuate noise below a predetermined frequency.

8. The apparatus of claim 7 wherein said amplifier circuit includes a compression amplifier providing an output signal approximating the logarithm of the input signal thereto.

9. The apparatus of claim 7, further including:
- means providing a potential source coupled to one of said source and drain electrodes of said field-effect transistor; and
- an inductance coupled in series between said potential source means and said one electrode, said inductance having a value selected to minimize noise signals above a predetermined frequency.

* * * * *

UNITED STATES PATENT OFFICE
CERTIFICATE OF CORRECTION

Patent No. 3,805,591  Dated April 23, 1974

Inventor(s) Barry G. Willis, Robert B. Taggart, Jr., Knud L. Knudsen, David Gee-Clough It is certified that error appears in the above-identified patent and that said Letters Patent are hereby corrected as shown below:

Column 5, Line 31, after frequency insert -- range --.

Signed and sealed this 10th day of September 1974.

(SEAL)
Attest:

McCOY M. GIBSON, JR.
Attesting Officer

C. MARSHALL DANN
Commissioner of Patents